United States Patent [19]

Keyser et al.

[11] 4,394,399
[45] Jul. 19, 1983

[54] LOW CALORIE TABLE SYRUP PRODUCT

[75] Inventors: William L. Keyser, East Dundee; Diane S. Kinney, St. Charles, both of Ill.

[73] Assignee: The Quaker Oats Company, Chicago, Ill.

[21] Appl. No.: 277,173

[22] Filed: Jun. 25, 1981

[51] Int. Cl.³ .............................................. A23L 1/09
[52] U.S. Cl. .................................. 426/658; 426/573; 426/613; 426/804; 127/29
[58] Field of Search .............. 426/658, 573, 804, 613; 127/29

[56] References Cited

U.S. PATENT DOCUMENTS

| | | | |
|---|---|---|---|
| 422,895 | 10/1890 | Miller et al. | 426/658 |
| 3,007,879 | 11/1961 | Jordan | 426/573 |
| 3,057,734 | 10/1962 | Pader | 426/658 |
| 3,355,444 | 11/1967 | Kalafatas et al. | 426/576 |
| 3,362,833 | 1/1968 | Smith | 426/658 |
| 3,622,343 | 11/1971 | Anwar | 426/658 |
| 3,897,262 | 7/1975 | Carlson | 426/658 |
| 3,958,033 | 5/1976 | Sims | 426/658 |

Primary Examiner—Jeanette M. Hunter
Attorney, Agent, or Firm—Neuman, Williams, Anderson & Olson

[57] ABSTRACT

A low calorie table syrup product consisting essentially of water, sugar, cellulose gum, salt, flavoring agent, anti-mycotic and sodium hexametaphosphate.

4 Claims, 2 Drawing Figures

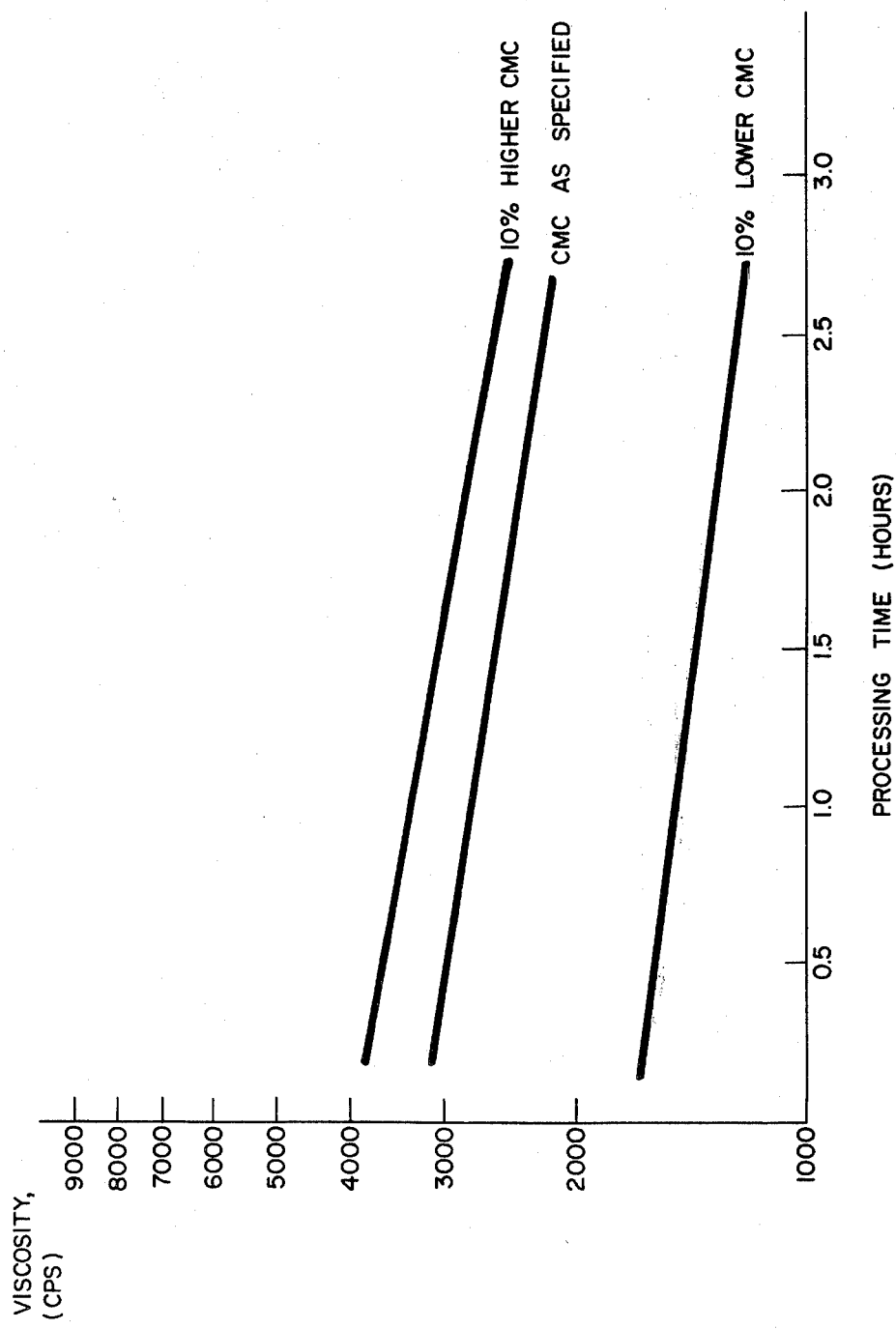

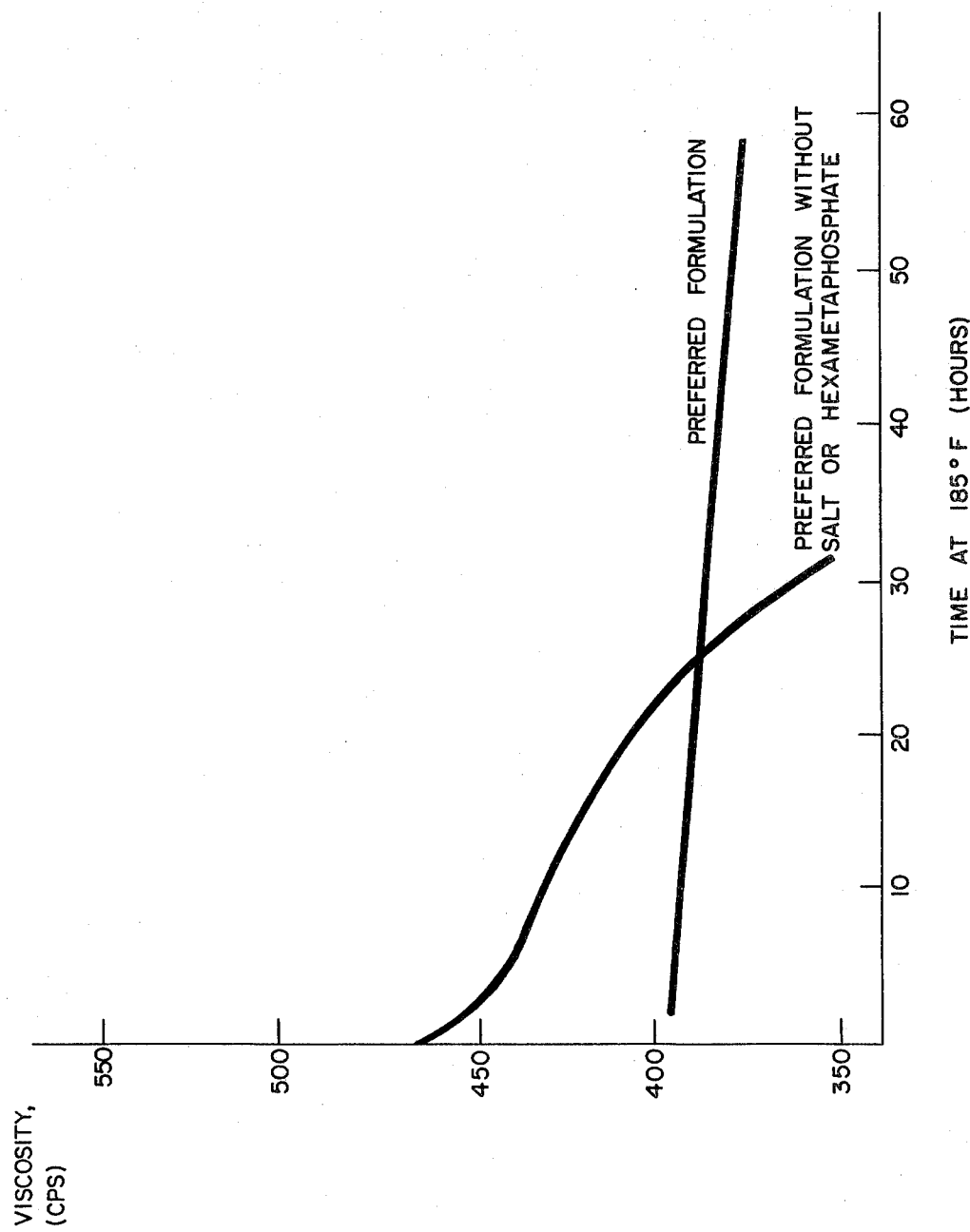

LOW CALORIE TABLE SYRUP PRODUCT

This invention relates to a syrup food of reduced caloric content.

Naturally occurring syrups, such as maple syrup, have long been used as toppings for ice cream desserts, pancakes, waffles and the like. Also, synthetic or manufactured table syrups are available and find widespread use. For example, United States patent No. 3,057,734 relates to pourable syrup products which comprise a flavored oil-in-water emulsion which contains sugar in an amount of 65% of the aqueous phase, about 1–40% fat, about 0.1% to 5% of water dispersible protein, gum arabic or an edible algin derivative and a flavoring agent. Similarly, United States Pat. No. 3,362,833 relates to a pourable oil-in-water emulsion for use as a table syrup comprising an aqueous phase containing at least about 65% sugar solids, an oil phase containing an edible oil in an amount of about 1–40% by weight and gum ghatti in an amount of about 0.1 to 1% of the emulsion.

In recent years considerable attention has been directed to food products and beverages which contain a significantly reduced number of calories per serving. While the commercial potential of "low or reduced" calorie table syrups has been recognized in the art, considerable difficulty has been encountered in producing syrups of this type which are acceptable to users accustomed to the older, higher caloric table syrups. To compare in acceptance with conventional table syrups, a low calorie syrup must possess a number of attributes. For example, the syrup must be pourable and have a relatively stable viscosity which does not undergo significant change during storage. The syrup must have an appropriate pH and must not tend to become cloudy with the passage of time. Also, the syrup should resemble the conventional syrup in appearance and should have an acceptable mouthfeel and desired pleasant taste while still containing a reduced number of calories. To meet the standard of identity, a table syrup must contain a minimum of 65% by weight of soluble sweetener solids. One commercial table syrup which conforms with the standard of identity contains 65.2% by weight sweetener solids and contains approximately 100 calories per fluid ounce.

It is therefore a principal object of this invention to provide syrup formulations containing a reduced number of calories which are comparable to higher calorie table syrups in taste, appearance, mouthfeel and pour characteristics.

It is an object of this invention to provide a pourable food product for use in table syrup applications which contains not more than approximately 65 calories per fluid ounce.

It is a further object of this invention to provide a pourable food product for use as a table syrup which contains no fat or artificial sweetening agents.

The present invention provides a food for use as a table syrup which has significantly reduced calorie content as compared with prior art table syrup formulations containing at least 65% by weight soluble sweetener solids. The syrup product of this invention comprises a sugar, water, a cellulose gum, salt, flavorants, anti-microbial preservatives, sodium hexametaphosphate and, if desired, coloring agents.

The sugar ingredient is a carbohydrate sugar, such as cane or beet sucrose, glucose, maltose, fructose, high or low conversion corn syrups and the like. The sugar is used in the product of the invention in amounts such that the total sugar solids content of the product does not exceed 43.3% by weight. The sugar and water are the principal ingredients in the novel formulations disclosed herein, which are aqueous based formulations containing no fat as contrasted with prior art oil-in-water emulsions. The sugar can be incorporated in the formulation in crystalline form which dissolves in the water used in the formulation or it can be incorporated in the form of a liquid sugar syrup. Preferably, the total sugar solids content of the product is maintained in the range of about 40 to 43.3% by weight. Lower amounts of sugar can be used with a corresponding reduction in sweetness. Brown sugar can be used as the sugar ingredient. The other ingredients disclosed herein are employed in the amounts specified, with water constituting the balance of the syrup formulation.

The cellulose gum employed is a medium or low viscosity carboxymethyl cellulose gum or derivative thereof, such as soluble metal salts, with a relatively high degree of carboxymethyl substitution. A medium or low viscosity carboxymethyl cellulose gum is one which exhibits a viscosity of from about 25 to 7000 centipoises when added to water at a 2% concentration level and viscosity determined at 25° C. on a Brookfield LVF Viscometer. By relatively high degree pf carboxymethyl substitution is meant there are about 0.70 to 0.95 carboxymethyl groups per anhydroglucose unit. Medium or low viscosity carboxymethyl cellulose gums and soluble metal salts thereof are well known and are commercially available such as, for example, from Hercules Chemical Company under the designations 9M31F, 9M8F and 7LF. A preferred gum is sodium carboxymethyl cellulose gum (9M31F sold by Hercules Chemical Company) having a degree of carboxymethyl substitution of 0.85–0.95.

The carboxymethyl cellulose (CMC) gum ingredient functions to impart a desired viscosity to the product, i.e. a viscosity of about 300 to 1000 centipoises and preferably in the range of 400 to 700 centipoises as measured on a Brookfield RVT viscometer at 20° C. using spindle #3 and 100 revolutions per minute. Generally, the carboxymethyl cellulose gum ingredient is used in an amount of about 0.5 to 1.0% by weight of the composition. Carboxymethyl cellulose gums have been found superior for use in this formulation in comparison with other gums such as, for example, xanthan, guar and carrageenan. In taste tests, off-flavors, off-odor and cloud formation were observed when other gums such as guar were employed in the formulations in lieu of the carboxymethyl cellulose.

Salt is used in the formulation in amounts from about 0.1 to 1.0% by product weight to accentuate flavors. Flavoring agents such as maple flavor, artificial butter, butterscotch, nut, ham or bacon, caramel, brown sugar and the like are used to impart a desired flavor and are usually used in small amounts, such as from 0.01 to 0.5% by weight. To insure microbiological stability, small amounts of an anti-mycotic agent or a combination of preservatives such as sorbic acid, potassium sorbate, sodium benzoate, with or without acidulants, and the like are used. Generally the preservatives are used in amounts from 0.01 to 0.5% by weight.

To maintain the viscosity of the syrup product in the desired range, sodium hexametaphosphate is used in amounts from 0.01 to 0.10% by weight. If desired, conventional edible coloring agents such as carmel color or a combination of FD & C yellow #5, red #40 and blue #1 can be utilized in the formulation to achieve a particular color. The food color can be added in small amounts sufficient to achieve a desired color appearance.

The following formulations represent typical flavored syrup products in accordance with the invention.

| Ingredients | Weight % |
| --- | --- |
| Sodium Carboxymethyl Cellulose | 0.5 to 1.0 |
| Salt | 0.1 to 1.0 |
| Antimycotic | 0.01 to 0.5 |
| Sodium Hexametaphosphate | 0.01 to 0.1 |
| Artificial Flavor/Color | 0.01 to 0.1 |
| Sugars | 40.0 to 43.3 |
| Water | Balance |
|  | 100.00 |

Typical analyses of the above formulations is as follows:

| | |
| --- | --- |
| Sugar Solids | 40-43.3% |
| pH | 4.5-4.9 |
| Color (% Transmittance at 560 mm) | 25-36 |
| Viscosity (cps, Brookfield RVT) | 400-700 |
| Calories (one fluid ounce) | <60 |
| Protein | 0 |
| Carbohydrate (one fluid ounce) | ~15 grams |
| Fat | 0 |

A preferred procedure for preparing the formulation is to combine and mix water, the carboxymethyl cellulose ingredient, salt and anti-mycotic such as a combination of sodium benzoate and sorbic acid to form a premix. To the premix is then added the sugar, sodium hexametaphosphate, flavorants and color, if any, and the mixture is mixed well. The mixture is then heated to sterilize. The syrup is then filtered, if necessary. The finished syrup is then bottled and capped. Filtration of the syrup is preferred to improve clarity. The filtration can be accomplished using a 3-5 u (micron) filter.

The interrelationship of the amounts of the ingredients employed in formulating table syrup products of this invention are important and the amounts of the ingredients must be controlled within relatively narrow ranges as disclosed herein to achieve an acceptable low caloric syrup resembling conventional high calorie syrups in flavor and mouthfeel. The sugar is a major ingredient of the formulation and imparts sweetness and calories to the product. Excess sugar adversely affects the flavor/sweetness balance and adds undesired calories. On the other hand, too little sugar adversely affects the flavor/sweetness balance and diminishes microbial stability. The water used in the formulation provides means for reducing the caloric content and for dissolving the dry ingredients. Excess water reduces the product viscosity, color intensity and flavor impact. The use of too little water results in a product too high in calories to be considered a reduced calorie product in accordance with the invention. The carboxymethyl cellulose gum interacting with sugar are the ingredients which provide the desired consistency and mouthfeel. Use of relatively small excess amounts of carboxymethyl cellulose increases viscosity and yields of product having an unacceptable, undesirable mouthfeel. The significant effect of varying the amounts of carboxymethyl cellulose is shown in FIG. 1. In FIG. 1, the viscosity of a premix consisting of water and sodium carboxymethyl cellulose is plotted against time using sodium carboxymethyl cellulose in the specified range and in amounts 10% in excess and 10% less than the specified range.

Salt is used in the formulation to improve and extend the flavor character. Excess salt makes the product too salty, while too little salt adversely reduces flavor impact. The sodium hexametaphosphate, at low levels, is unique in providing long term viscosity stability.

The effect of sodium carboxymethyl cellulose interacting with sugar and sodium hexametaphosphate on the control and maintenance of the desired viscosity of a preferred formulation is shown in FIG. 2 of the drawing.

Those modifications and equivalents which fall within the spirit of the invention are to be considered a part thereof.

What is claimed is:

1. An edible, fluid, fat-free syrup composition for use as a table syrup containing not more than 60 calories per fluid ounce consisting essentially of water and not more than 43.3% by weight of the composition sugar solids, 0.5 to 1.0% by weight of the composition a medium viscosity carboxymethyl cellulose gum having a high degree of carboxymethyl substitution or a derivative thereof, 0.1 to 1.0% by weight of the composition salt, 0.01 to 0.5% by weight of the composition an edible anti-mycotic agent, 0.01 to 0.10% by weight of the composition sodium hexametaphosphate, and 0.01 to 0.5% by weight of the composition a flavorant.

2. A composition in accordance with claim 1 which also contains an edible food color.

3. A composition in accordance with claim 1 in which the sugar solids content is about 40.0 to 43.3% by weight of the composition.

4. A process for producing an edible, fluid, fat-free syrup composition for use as a table syrup which contains not more than 60 calories per fluid ounce which comprises mixing together water, a medium viscosity carboxymethyl cellulose gum having a high degree of carboxymethyl substitution or derivative thereof, salt and an anti-mycotic to form a premix, then adding to and mixing with the premix sugar, sodium hexametaphosphate and a flavorant, and then heating the composition to a temperature sufficient to sterilize the composition, said cellulose gum being employed in an amount of 0.5 to 1.0% by weight of the compoistion, salt being employed in an amount of 0.1 to 1.0% by weight of the composition, the anti-mycotic being employed in an amount of 0.01 to 0.5% by weight of the composition, the sodium hexametaphosphate being employed in an amount of 0.01 to 0.10% by weight of the composition, the flavorant being employed in an amount of 0.01 to 0.5% by weight of the composition, and the sugar being employed in an amount not more than 43.3% by weight of the composition.

* * * * *